Sept. 25, 1951  J. J. KOVAC  2,568,858

AUTOMATIC ADJUSTMENT PISTON STOP

Filed Jan. 21, 1949

INVENTOR.
JAMES J. KOVAC
BY
ATTORNEY

Patented Sept. 25, 1951

2,568,858

UNITED STATES PATENT OFFICE 2,568,858

AUTOMATIC ADJUSTMENT PISTON STOP

James J. Kovac, Akron, Ohio, assignor to Wingfoot Corporation, Akron, Ohio, a corporation of Delaware Application January 21, 1949, Serial No. 71,923

4 Claims. (Cl. 188—152)

This invention relates to piston stops, particularly to an automatically adjustable piston stop for use in a spot type brake for aiding in obtaining instantaneous brake action upon application of a brake control device.

The present invention particularly relates to spot type brakes and especially to those having an automatic adjustment piston or pin, such as is shown in U. S. Patent No. 2,392,970 wherein the adjustment pin is moved axially inwardly of the brake as brake block wear occurs. In brake constructions of this type, a rotating disc is provided which is carried by a wheel on which braking action is to be effected. Such rotating disc may be free for limited axial movement which occurs upon brake application to aid in bringing brake blocks into contact with opposite sides of the rotating disc for brake action. Means are provided in brakes of this type for effecting movement of the brake components parallel to the axis of the rotating disc and such means includes a piston which is designed to limit the operative and inoperative positions of at least one brake block and thus controls the brake clearance when the brake is not being operated.

It has been found that after wear occurs in the brake and the aircraft or other vehicle on which the brake is positioned is stunted or goes through strenuous aerial or other maneuvers, the weight of the rotating brake disc will tend to force the piston and the clearance stop of the brake rearwardly or outwardly of the brake contrary to the desired action of same and provide excessive brake clearance whereby brake action will not be obtained instantaneously with application of the brake control device. In fact, the improper or release movement of the brake control rod in some instances has been of such an extent that one or more of the brake blocks has even fallen from its positioning recess in the brake.

The general object of the present invention is to avoid and overcome the foregoing disadvantage of spot type of brakes and to provide a device on a spot type of a brake which has an automatic adjustment clearance rod therein so that wear compensating movement of the pressure piston inwardly of the brake is not seriously affected but undesired outward movement of such piston is effectively prevented.

Another object of the invention is to provide a safety device in a spot type of a brake for preventing the establishment of an undesirable amount of brake clearance and to retain a brake block is a given operative position.

Another object of the invention is to provide an automatic adjustment piston stop which permits movement in one direction but retards or prevents movement in an opposite axial direction and in which the stop can be readily repositioned manually to allow replacement of brake blocks or linings.

A further object of the invention is to provide an inexpensive, uncomplicated, automatic piston stop which has a positive limiting action on undesired release movement of the piston.

The foregoing and other objects and advantages of the invention will be made more apparent as the specification proceeds.

For a better understanding of the invention, attention is now directed to the accompanying drawings wherein.

Figure 1:
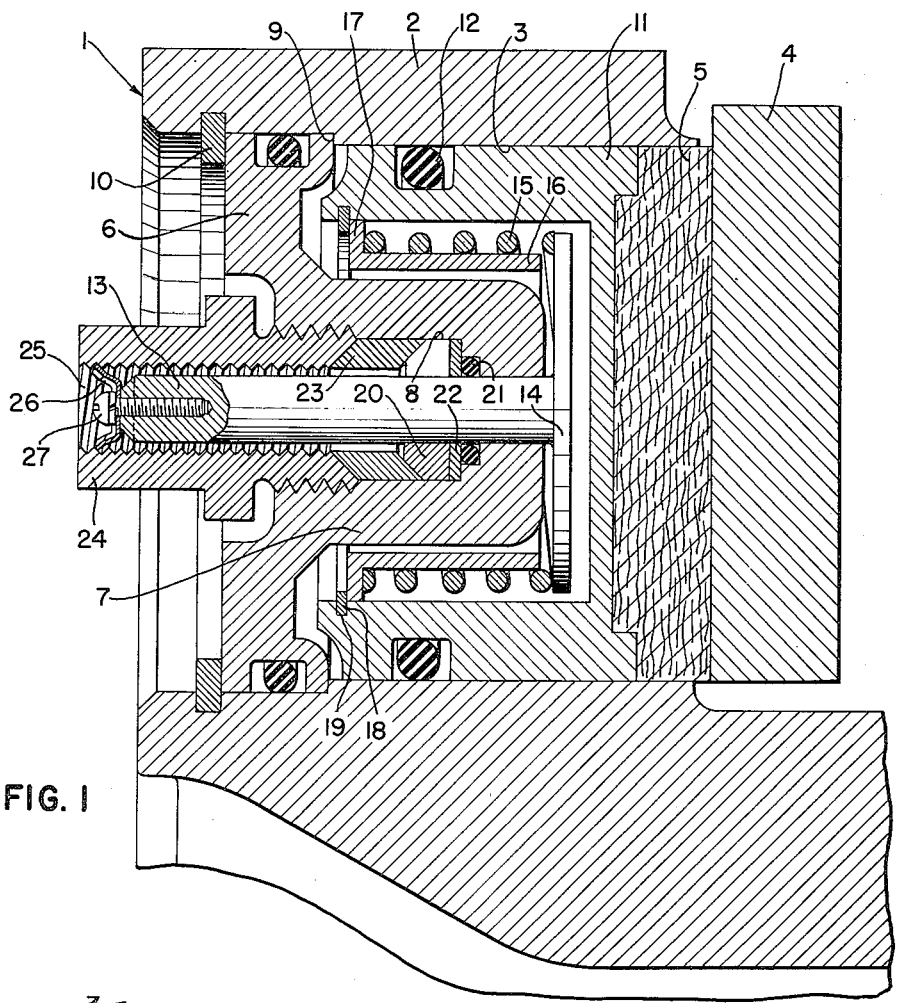
Fig. 1 is a longitudinal section through an automatic adjustment piston stop embodying the principles of the invention.

The present invention, broadly speaking, relates to the provision of a resilient cup which is secured to an adjustable stop rod received in a tubular member, for example, secured in a spot type brake. The tubular member has a threaded bore in which the cup and rod are received and the lips of the cup are adapted to engage with the threads in the bore and be sprung over same to be drawn axially inwardly of the brake, but upon the tendency toward outward axial movement of the rod, to be forced out tightly against the threads thereby preventing axial outward movement of the rod and the associated brake piston.

Reference now is directed to the details of the structure shown in the accompanying drawings and in this instance a spot type of a brake, indicated in general by the numeral 1, is provided. This spot type of a brake includes a brake frame or housing 2 which has a tubular bore 3 provided therein for receipt of brake actuating means. The housing 2 has a brake disc 4 positioned adjacent same, which disc is secured to a wheel (not shown) and rotates therewith. A brake block or lining 5 is provided for frictional braking action against one lateral portion of the brake disc 4. The remaining portions of the brake 1 are of conventional construction and are not shown in the drawing.

The operating mechanism for forcing the brake block 5 against the brake disc 4 includes a sealing cap or disc 6 that has an apertured tubular boss 7 extending therefrom. The boss 7 has a bore 8 extending therethrough. Usually the disc 6 seats on a shoulder 9 formed in the bore 3 and is retained thereagainst by means of a split snap ring 10 which seats in a recess formed in the bore 3 adjacent what will be called its axially outer end. A brake actuating piston 11 is received in the bore 3 for sliding movement with relation thereto. This piston 11 is adapted to engage with the brake block 5 and control the position thereof. Conventional hydraulic fluid conduit means connect to the brake housing 2 for forcing hydraulic fluid between the disc 6 and the piston 11, which action forces the piston 11 axially inwardly of the brake and moves the brake block against the surface of the brake disc 4. The piston 11 may carry an O-ring or other sealing device 12 in a recess formed in the periphery thereof to aid in sealing the sleeve 11 in the bore 3.

The brake device 1 also includes a self-adjusting pin or rod 13 which is received in the bore 8 of the boss 7 and has a head 14 that is positioned in the chamber formed between the disc 6 and the cap or closed end of the piston 11. The head 14 limits return or clearance movement of the piston 11 and such movement is provided by means of a conventional coil spring 15 that is shown as being carried by a positioning sleeve 16 which has a radially outwardly extending flange 17 formed on one end thereof. The flange 17 normally seats against a split snap ring 18 that engages with a recess 19 formed in the bore of the piston 11. As shown, the sleeve 16 is made slightly shorter than the distance between the head 14 and the initial no load, or clearance position of the piston 11. The mechanism described provides a lost-motion connection between the piston 11 and the rod 13.

Any movement of the rod 13 is frictionally retarded by means of a friction ring 20 which comprises a split metal ring that can be compressed radially into engagement with the rod 13. Liquid in the compartment formed between the piston 11 and the disc 6 is prevented from flowing back into the bore of the boss 7 by means of an O-ring or other sealing gasket 21 spaced from the ring 20 by a washer 22. The friction ring 20 is compressed radially into frictional engagement with the rod 13 by means of a tubular spacer 23 which has a conical inner end surface adapted to engage with a conical outer end surface of the ring 20. An adjustment nut 24 is provided in threaded engagement with the bore 8 of the boss 7 whereby the nut can be initially screwed tightly against the spacer 23 to force the friction ring 20 into the desired friction contact with the rod 13. It will be noted that the adjustment nut 24 is tubular and has threads 25 tapped in its bore.

As an important feature of the present invention ratchet means are provided between the rod 13 and the brake frame to releasably allow rod movement in only one direction. Specifically, the rod 13 carries a resilient member for engagement with the threads 25 to prevent axial outward movement of the pin 13 with relation to the brake housing 2. It will be understood that upon brake actuation pressure is set up behind the piston 11 to force it and the brake block 5 out into braking association with the brake disc 4, and such actuation, as wear of the brake block 5 occurs, will ultimately bring the positioning sleeve 16 up against the disc or head 14 of the adjusting rod 13. Thus, as further wear occurs in the brake block 5, the sleeve 16, which moves integrally with the piston 11, will exert an axially inwardly direct pressure upon the head 14 and rod 13 to move them axially inwardly of the brake housing until the brake block 5 is in close operative association with the brake disc 4. Such movement of the rod 13 occurs only when the retarding action of the friction ring 20 is overcome. The spring 15 only effects a limited rearward movement of the piston 11 from any given position of the pin 13 and head 14 to thereby reestablish brake clearance.

Figures 2, 3:
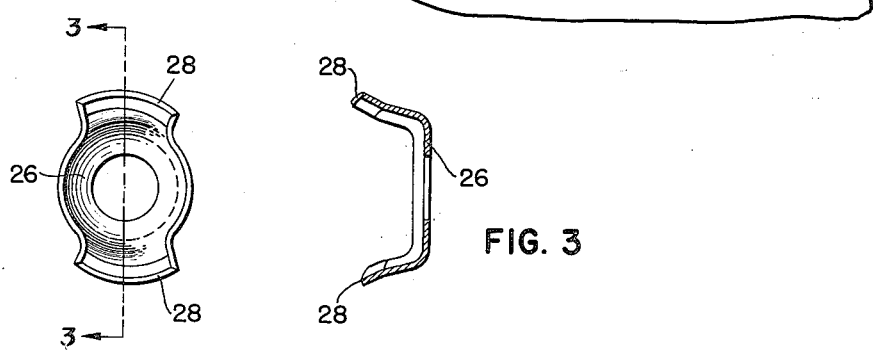
Fig. 2 is a plan of the resilient lock member of the invention.
Fig. 3 is a section taken on line 3—3 of Fig. 2.

In the embodiment of the invention shown and described, a spring cup 26 is secured to the axially outer end of the rod 13 by a screw 27. This spring cup 26, as best seen in Figs. 2 and 3, has two diametrically opposed arcuate lip sections 28 provided thereon which extend axially and radially outwardly to engage at their outer edges with the threads 25 formed in the adjusting nut 24. By positioning and forming the spring cup as shown, the spring cup lip sections 28 can relatively easily be snapped over the threads 25 on axial inward movement of the rod. However, when any axially outwardly directed force is set up on the rod 13, it will cause the lip sections 28 to lock more tightly into engagement with the threads 25 and prevent displacement of the rod 13 outwardly of the brake. Of course, when it is desired to reposition the rod 13, as when a new brake block 5 is inserted, the spring cup 26 can be rotated in the threads 25 to back it and the rod and piston off to their initial position.

In actual tests it has been established that the spring cup can be moved axially inwardly of the brake by a relatively small pressure, such as about 22 pounds of force, whereas outward movement of the spring cup was not occasioned by a force of 425 pounds but the cup broke under such force.

In some instances, it might be desired to provide other types of resilient members in place of the spring cup 26 shown and such modification is within the concept of the invention which particularly contemplates the use of any safety member on the rod 13 so that it can be moved axially inwardly of a brake relatively easily but which will resist outward movement from much greater force and in so doing will supplement the action of the friction ring 20. In place of the threads shown provided in the bore of the adjustment nut, which are definitely preferable for reasons noted, other stop means could be provided therein, such as a plurality of conical sections, but normally the maximum and minimum diameters of different longitudinal portions of the bore in the adjustment nut should be uniform. In all events, the piston stop of the invention is formed from a minimum of simple parts but still provides effective stop means against undesired movement of the brake adjusting rod, as wear occurs in the lining material of the brake.

While certain representative embodiments and details have been shown for the purpose of illustrating the invention, it will be apparent to those skilled in this art that various changes and modifications may be made therein without departing from the spirit or scope of the invention.

What is claimed is:

1. In a spot type of a brake having an automatic wear adjustment device, a brake housing, an adjusting rod, a tubular retaining member in which said rod is received, said member being secured to said housing and having a threaded bore, the axially outer end of said rod being within the bore of said member, a spring cup member secured to said rod and being adapted to engage at its edge with the threads in the bore of said retaining member to prevent axial outward movement of said rod, said spring cup being open in a direction extending axially outwardly of the said bore and being adapted to be snapped over one of said threads in said bore by a relatively small axially inwardly directed force exerted thereon, and adjustable pressure friction means other than the cup member for yieldably holding the rod against movement in the member.

2. A brake including a frame having a bore, a piston slidably received in the bore, brake lining material associated with the piston, a rod coupled by a lost-motion connection to the piston, adjustable pressure friction means carried by the frame and engaging frictionally with the rod, and releasable ratchet means positioned between the rod and frame member for allowing movement of the rod in substantially only one direction.

3. A brake including a frame having a bore, a piston slidably received in the bore, a rod coupled by a lost-motion connection to the piston, friction means carried by the frame and engaging frictionally with the rod, ratchet means positioned between the rod and frame member for allowing movement of the rod in substantially only one direction, and means for adjusting the amount of friction exerted by the friction means on the rod.

4. In a brake, an adjusting rod, a frame member having a stepped bore in which said rod is positioned, a tubular retaining member surrounding the rod and threaded into the larger portion of the bore, threads on the inside of the tubular retaining member, a resilient lock member carried by said rod and adapted to be engaged with the inside threads of the retaining member, said lock member being movable axially inwardly of said retaining member but being very resistant to axial outward movement, and adjustable pressure friction means other than the lock member and positioned between the frame member and the retaining member for yieldably holding the rod against movement in the frame member, the pressure on the friction means being adjusted by turning the retaining member.

JAMES J. KOVAC.

REFERENCES CITED

The following references are of record in the file of this patent:

UNITED STATES PATENTS

| Number | Name | Date |
|---|---|---|
| 1,825,555 | Stern | Sept. 29, 1931 |
| 2,392,970 | Bricker | Jan. 15, 1946 |

FOREIGN PATENTS

| Number | Country | Date |
|---|---|---|
| 493,091 | Great Britain | Oct. 3, 1938 |
| 514,571 | Great Britain | Nov. 13, 1939 |